(12) United States Patent
Alberternst et al.

(10) Patent No.: US 7,819,171 B2
(45) Date of Patent: Oct. 26, 2010

(54) AIR CONDITIONING SYSTEM

(75) Inventors: Thomas Alberternst, Aachen (DE);
Michael Fietz, Aachen (DE); Graham R. Johnstone, Binley (GB); Andrew William Rowntree, Warwick (GB); Graham Kirby, Worksop (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 445 days.

(21) Appl. No.: 11/045,881

(22) Filed: Jan. 28, 2005

(65) Prior Publication Data

US 2006/0116061 A1    Jun. 1, 2006

(30) Foreign Application Priority Data

Jan. 28, 2004   (DE) .................. 10 2004 004 462
Nov. 24, 2004   (DE) .................. 10 2004 056 814

(51) Int. Cl.
*B60H 27/00*   (2006.01)

(52) U.S. Cl. .................. 165/42; 62/186; 62/244; 62/404; 62/427; 454/121; 454/143; 454/126; 454/160; 165/203; 236/12.1

(58) Field of Classification Search ............ 165/42, 165/203; 62/186, 244, 404, 427; 236/12.1; 454/121, 143, 126, 160
See application file for complete search history.

(56) References Cited

U.S. PATENT DOCUMENTS

| 4,759,269 | A  | * | 7/1988  | Brown et al. ................... 454/75 |
| 5,186,237 | A  | * | 2/1993  | Adasek et al. ................ 165/42 |
| 5,950,711 | A  | * | 9/1999  | Bendell ....................... 165/42 |
| 7,434,612 | B2 | * | 10/2008 | Alberternst et al. ......... 165/203 |
| 2002/0139513 | A1 | * | 10/2002 | Natsume et al. ............... 165/42 |
| 2003/0213579 | A1 | * | 11/2003 | Nakagawa et al. ............ 165/42 |
| 2004/0069444 | A1 | * | 4/2004  | Clifford ....................... 165/42 |
| 2004/0112075 | A1 | * | 6/2004  | Kachi ........................... 62/244 |
| 2005/0126774 | A1 | * | 6/2005  | Yamaguchi et al. ......... 165/204 |

* cited by examiner

*Primary Examiner*—Frantz F Jules
*Assistant Examiner*—Azim Rahim
(74) *Attorney, Agent, or Firm*—Brinks Hofer Gilson & Lione

(57) ABSTRACT

An air conditioning system for providing air conditioning to the interior of an automotive vehicle with a mixing chamber designed to create, by controlled mixing of a warm and of a cool partial air flow, at least one warmer and one cooler air-conditionable air flow. The flow paths of the warm partial air flow and of the cool partial air flow intersect in the mixing chamber.

7 Claims, 3 Drawing Sheets

AIR CONDITIONING SYSTEM

BACKGROUND OF THE INVENTION

1. Field of the Invention

The present invention is directed to an air conditioning system providing for the cross-flow mixing of a warm air flow with a cool air flow.

2. Related Technology

Air conditioning systems for the automobile sector are designed to create at least one air flow that is adapted to be conditioned according to the user's wishes, i.e. an air flow that is freely adjustable in intensity or temperature.

In order to create such an air flow, ambient air is taken by a fan and is fed into the conditioning unit of the air conditioning system after having traversed a filter. There, the ambient air intake is cooled to a defined initial temperature by means of a heat exchanger in which a liquefied refrigerant is vaporized. This initial temperature is typically less than 10° C., and often is on the order of 4° C. As the air intake is cooled down, it is also dehumidified. A cool air flow with a defined initial temperature and defined initial air humidity is thus created.

A portion of this air flow is conducted through another heat exchanger in which a heated medium, e.g., the cooling fluid of the automotive vehicle's drive unit, is circulated. Since the temperature of the coolant is substantially constant when the automotive vehicle is operating, a warm partial air flow of a substantially constant temperature is thus created. The thus provided cool and warm partial air flows are then supplied to a mixing chamber in a mix ratio that is to be controlled by suited actuator elements.

The mixing chambers of prior art air conditioning systems rely on controlled mixing of the warm and cool partial air flows supplied to the mixing chamber. This mixing is performed in such a manner that a mixing zone with a shear layer having a stable temperature profile along an axis is formed within the mixing chamber. A typical feature of these mixing chambers is that the flow paths of the supplied warm and cold partial air flows do not traverse the mixing chamber in a straight line. In graphical terms, a warmer air conditioned air flow generally does not exit the mixing chamber on the side opposite the entrance site of the warm partial air flow. As a rule, the warmer air flow created in the mixing chamber rather exits the mixing chamber at an angle of about 90° to the flow direction of the incoming warm partial air flow. If the flow path of the warmer partial air flow in the mixing chamber is understood to refer to the flow path that runs from the entrance site of the warm partial air flow to the exit site of the warmer air-conditioned air flow, the flow path of the warm partial air flow running through the mixing chamber is not straight but angled. The same applies to the flow path of the cool partial air flow. In a conventional mixing chamber, the incoming warm and cool partial air flows meet in such a manner that they strike each other at an angle and are redirected toward their respective exit sites, forming thereby a shear layer located between the redirected partial air flows. The temperature of the partial flow exiting the mixing chamber is thereby substantially determined by the arrangement of the exit ports, since it is the arrangement of the exit ports that permits to determine which spatial region of the shear layer is fed to the exit port.

This permits to adjust the temperature of the air-conditionable air flow exiting the outlet by selecting the spatial position of an outlet along this axis. It is in particular possible to provide the mixing chamber with various outlets which are arranged in different locations along said axis. It is thus possible to create a plurality of conditioned air flows of different temperatures without changing the mix ratio of the cool and warm air flows supplied. As a rule, the temperature difference between the air flows or the relationship between the temperatures of the air flows is predetermined by selecting the outlet locations from the mixing chamber.

Changing the mix ratio of the incoming warm and cool partial air flows by simultaneously actuating the corresponding actuator elements causes the temperature of all of the conditioned air flows exiting the mixing chamber to change. This means that the various air flows created are not adapted to be individually air-conditioned, but only to be commonly air-conditioned. Still, creating air flows that are not adapted to be individually air-conditioned for providing air conditioning to an automotive vehicle's interior may be advantageous since the physiological requirements placed for example on the temperature of the air flows blown into the automotive vehicle's interior are different for different parts of the human body. The lower limbs for example, especially the feet, are particularly sensitive to cold so that, here, an incoming air flow, which is warmer than the one blown into the region of the dashboard/the console, offers physiological advantages and feels pleasant to the user of the automotive vehicle.

The disadvantage of the "stratified air flow mixer concept" however is that, in order to achieve the static temperature profile mentioned, the incoming warm and cool partial air flows are usually blown from one end of the mixing chamber. This results in a strong geometrical limitation on the choice of the flow paths of the warm and cool partial air flows supplied to the mixing chamber, which in turn restricts the possibilities of construction and design.

SUMMARY

It is therefore the object of the present invention to provide an air conditioning system for an automotive vehicle that comprises a mixing chamber providing for an alternative way of supplying the warm and cool partial air flows to be blended.

The present invention relies on the use of a mixing chamber for the air conditioning system of the invention that does not make use of the prior art "stratified air flow mixer concept". Instead, the present invention proposes a novel mixer concept that will be referred to herein as a "crossflow mixer".

Like before, a mixing chamber for creating at least one warmer and one cooler air flow adapted to be commonly air-conditioned is provided in the air conditioning system. In this mixing chamber, a warm and a cool partial air flow are blended like before at a selectable ratio by means of suited actuator elements. However, unlike with the stratified mixer concept realized hereto before, this concept does not substantially aim at forming a shear layer for blending the warm and cool partial air flows that have been blown into the mixing chamber.

In accordance with the invention, this general concept is carried out by supplying one cool and one warm partial air flow to the mixing chamber in such a manner that the generated flow paths of the warm and of the cool partial air flow intersect in the mixing chamber.

This novel concept of the "crossflow mixer" can be selectively improved by dimensioning by suited means the mixing zone thus formed within the mixing chamber in such a manner that the warm and the cold partial air flows do not completely blend in the mixing zone. This incomplete blending can be encouraged by arranging flow dividers in the flow paths of the cool and/or the warm partial air flow, the flow dividers supplying but a certain fraction of the partial air flows to the mixing zone and leading the remaining fraction of the partial air flow to an outlet, with said remaining fraction coming only into slight contact with the other one of the partial air flows.

In graphical terms, in a preferred exemplary embodiment, a certain fraction is for this purpose branched off the warm partial air flow entering the mixing chamber. The remaining (warm) fraction of the warm partial air flow traverses the mixing chamber on a substantially straight first flow path and thus reaches a first outlet. A certain portion is also branched off the cool partial air flow entering the mixing chamber, the (cool) remainder portion of the cool partial air flow traversing the mixing chamber on a substantially straight or S-shaped second flow path leading out of the mixing chamber through a second outlet. In the mixing chamber the respective ones of the branched warm and cool air flows are mixed in a controlled manner with the respective one of the cool and warm remaining air flows.

The further proposed selective dimensioning of the mixing zone may be carried into effect in various ways, for example by inserting suited flow conducting means into the mixing chamber. Further, the size of the mixing zone that is being formed can be influenced by suitably conducting the warm and cool partial flow in the mixing chamber, for example by allowing the warm and cool partial air flows to enter the mixing chamber at appropriate angles.

More specifically, particular advantages are obtained when the warm and the cool partial air flows are caused to flow in a counterflow pattern within the mixing zone. The term "counterflow" is thereby to be construed such that the vectorial variable "flow direction" of the one partial air flow comprises a component that is directed in a direction counter to the direction of the other partial air flow. This more specifically means that the flow directions of the two partial air flows within the mixing zone are inclined to each other at an angle of 90° or more. Such a flow pattern however is not absolutely necessary for realizing the "crossflow mixer" concept of the invention, though.

It has further been recognized that it would be advantageous to limit the extension of the mixing zone by flow directing means disposed within the very mixing chamber. It has thereby proved efficient to dispose a chimney as the flow directing means in the mixing chamber. Advantageously, such a chimney is for example disposed downstream of the mixing zone in the flow path of the warm partial air flow forming in the mixing chamber. Alternatively, the chimney may also be disposed in the flow path of the cool partial air flow downstream of the mixing zone, i.e., downstream of the intersection of the two partial air flows. If a chimney is provided as the flow conducting means in the mixing chamber, it is particularly advantageous if the entrance area of the chimney comprises an entrance cross section that is smaller than the entrance area of the entrance port of that partial air flow in the mixing chamber in which flow path the chimney is disposed. In graphical terms, this means that the chimney cuts a smaller partial flow out of the partial air flow that has traversed the mixing zone and in which flow path the chimney is arranged. Accordingly, the chimney also acts as a flow divider.

Particular advantages are further obtained if an outlet for an air-conditionable air flow is disposed opposite the entrance port of one of the warm or cool partial air flows. As a result thereof, a (warm or cool) partial air flow traversing the mixing chamber is given a substantially straight flow path in the mixing chamber. By contrast, the flow path of the other one of the warm or cool partial air flows through the mixing chamber can be deflected from its straight course by inserting into the mixing chamber further flow directing means, given this is required e.g., by construction conditions. Said deflection may more specifically be such that the flow path that is being generated partially runs in a direction counter to the direction of the first flow path, which runs straight. It has proved particularly efficient to form in the mixing chamber, as the flow directing means, an impingement baffle for the partial air flow that is to be deflected.

BRIEF DESCRIPTION OF THE DRAWINGS

Further advantages and features of the "stratified flow mixer" air conditioning system of the invention will become apparent upon reading the subordinate claims and the following non-restrictive description of embodiments, given by way of example only, with reference to the appended drawing in which:

DETAILED DESCRIPTION

Figure 1:
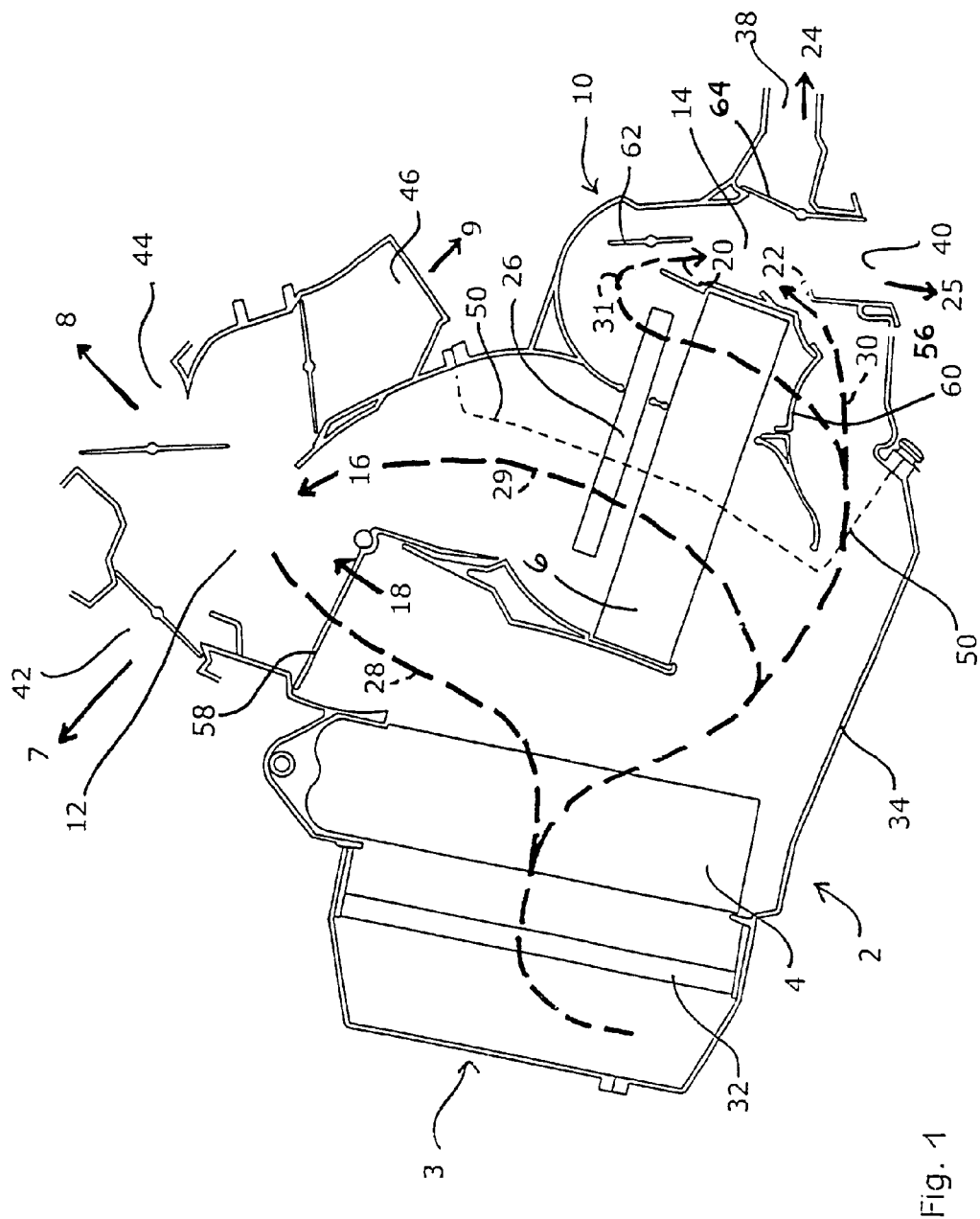
FIG. 1 is a sectional view of a multiple zoned air conditioning system with two mixing chambers.

FIG. 1 is a sectional view of a multiple zoned air conditioning system 1 for independently conditioning two zones of an automotive vehicle, more specifically of the first row of seats and of the rear zone of the automotive vehicle. The section is thereby taken in the plane of symmetry of the main air conditioning module 2 of the air conditioning system 1. In the mounting position in the automotive vehicle, this plane of symmetry is generally oriented both in the direction of travel and in the vertical direction.

The air conditioning system 1 in accordance with this exemplary embodiment is divided into various modules that are readily interchangeable and are tightly connected together when the air conditioning system 1 is operable. The air conditioning system 1 comprises a main air conditioning module 2 with a base member 34. On the inlet side, an air supply module 3 in which a fan (not shown) is disposed is connected to the base member 34. The fan serves to take ambient air in. The base member 34 of the main air conditioning module 2 and the air supply module 3 are configured in such a manner that the air supply module 3 and the fan may be disposed on the right or on the left side of the main air conditioning module 2 (as viewed in the direction of travel of the automotive vehicle) alternatively. The multiple zoned air conditioning system 1 of the invention is thus suited to being mounted both in right hand drive and in left hand drive automotive vehicles. The ambient air taken by the fan into the air supply module 3 is directed through an (optional) filter 32 (not shown in FIG. 1a) disposed in the air supply module into the interior of the base member 34 of the main air conditioning module 2.

The ambient air taken by fan passes through an air filter 32 before it enters the base member 34 of the main air conditioning module 2. A first heat exchanger 4, in which a liquefied refrigerant is vaporized, is disposed directly behind the filter 32. The thus generated cold serves to cool down to a defined initial temperature (e.g. 4° C.) the ambient air that has been taken in and to remove by condensation the humidity contained therein.

Upon passage through the first heat exchanger 4, the cooled dried air is divided into a plurality of flow paths as shown by the discontinuous lines in FIG. 1. A first flow path 29 leads a first portion of the air flow exiting the first heat exchanger 4 through the second heat exchanger 6 disposed within the base member 34 and through an electric heating element 26 disposed downstream thereof. The second heat exchanger 6 is connected to the coolant circuit of the automotive vehicle drive unit. The coolant circulating therein has a quite high temperature of typically about 100° C. The electric heating element 26, which is mounted downstream thereof and which is optional, may be additionally connected if the heat demand in the air conditioning system can no longer be met by the heat loss of the automotive vehicle drive unit. This condition may for example occur in the warm-up phase of the drive unit. The additional heating element 26 may, however, also be permanently necessary given the operable automotive vehicle drive unit is highly efficient and, as a result thereof, comprises a low heat loss rate. An example thereof is the modern common rail diesel engine.

The branched first partial air flow warms up as it passes via the first flow path 29 through the second heat exchanger 6 and through the optional heating element 26 and enters thereafter, from the bottom, as the first warm partial air flow 16, into the first mixing chamber 12 of the multiple zoned air conditioning system 1 of the invention, which is disposed in the main air conditioning module 2.

On a second flow path 31, a second, initially cool partial air flow also passes through the second heat exchanger 6 and through the optional heating element 26, said second flow path 31 being separated from the first flow path 39 by barriers. On the second flow path 31, a second warm partial air flow 20 is created, which enters a second mixing chamber 14 disposed in a separate rear zone module 10 from the top.

A third flow path 28, which again is separated from the first flow path 29 by barriers, leads a first cool partial air flow 18 into the first mixing chamber 12 from the bottom. The mix ratio between the first warm partial air flow 16 and the first cool partial air flow 18 is adjusted by means of an angled mixing valve 58.

On a fourth flow path 30, a last cool partial air flow is finally conducted from the first heat exchanger 4 to the second mixing chamber 14, which it enters from the side, as the second cool partial air flow 22. The mix ratio of the second warm partial air flow 20 to the second cool partial air flow 22 is adjusted by means of an adjustable mixing valve 60.

The multiple zoned air conditioning system of the invention having a main air conditioning module 2 and a rear zone module 10 is thereby made operative by inserting the rear zone module 10 into the base member 34 of the main air conditioning module 2, the two modules being jointed together. The junction 50 where the base member 34 of the main air conditioning module 2 is connected to the rear zone module 10 forming on the superimposed joint surfaces of the two modules is shown by a dash-dot line in FIG. 1. The connection between the main air conditioning module 2 and the rear zone module 10 is thereby configured to be overpressure proof. Once the rear zone module 10 is inserted into the main air conditioning module 2, it is preferably secured in place on the main air conditioning module 2 by screwing. The rear zone module 10 is thereby configured such that the first flow path 29 described herein above, which leads into the first mixing chamber 12 disposed in the main air conditioning module 2, does not form until the rear zone module 10 is disposed on the main air conditioning module 2. Further, the second flow path 31, which extends through the main air conditioning module 2 and the rear zone module 10, does not form until the rear zone module 10 is disposed on the main air conditioning module 2.

Both the first flow path 29 and the second flow path 31 extend through the second heat exchanger 6 and through the optional heating element 26. In this manner, a space-saving configuration of the multiple zoned air conditioning system may be realized. Substantial constructional features may be realized by having the rear zone module 10 and the main air conditioning module 2 share both the second heat exchanger 6 and the optional heating element 26 and by having both the first flow path 29 leading to the first mixing chamber 12 of the main air conditioning module 2 and the second flow path 31 leading to the second mixing chamber 14 of the rear zone module 10 passing through one and the same second heat exchanger 6 and through one and the same additional heating element 26. The rear zone module 10 may thus dispense with an additional (second) heat exchanger or with a second optional heating element. This allows a particularly compact construction of the multiple zoned air conditioning system of the invention.

The first mixing chamber 12, which is formed in the main air conditioning module 2, functions in the same way as the often realized mixing chambers formed in prior art air conditioning systems. The concept behind the mixer in accordance with the present invention is termed a "stratified air flow mixer". The first warm partial air flow 16 and the first cool partial air flow 18 are supplied to the first mixing chamber 12 from the bottom. In the first mixing chamber 12, the first and the second partial air flow 16, 18 are mixed in such a manner that a shear layer with a fixed temperature profile forms in the vertical direction within the first mixing chamber 12. This means that, depending on the location of the outlet, an air-conditionable air flow 8, 9 exits the first mixing chamber 12 the temperature of which depends on the exact position of the outlet in the vertical direction. This principle of construction is regularly made use of in prior art. It permits to create a plurality of air-conditionable air flows of different temperatures using one mixing chamber supplied with one warm and one cool partial air flow. As a rule however, the air flows of different temperatures thus created will not be adapted to be air-conditioned independently of one another. Usually, there is rather a temperature difference between the created air-conditionable air flows. By the appropriate design of the air conditioning system this difference may be kept constant over the widest possible temperature and ventilation range.

In the case of the present multiple zoned air conditioning system 1, three outlets 42, 44 and 46 are provided in the region of the first mixing chamber 12. In the upper region of the mixing chamber 12 there is disposed a defrost outlet 42 and a front panel outlet 44. Air-conditionable air flows 7 and 8 of slightly different temperatures exit the defrost outlet 42 and the front panel outlet 44.

A front leg space outlet 46, through which much warmer air is caused to exit the first mixing chamber 12, is disposed much lower in the vertical direction in the first mixing chamber 12. In this manner, (cooler) first air-conditionable air flows 7 and 8 exiting the outlets 42 and 44 and one (warmer) second air-conditionable air flow 9 exiting the leg space outlet 46 are created using but one first mixing chamber 12. The absolute and relative intensity of the air flows 8 and 9 exiting the outlets 42, 44 and 46 is controlled by means of the fan and of mixing valves which are disposed in the region of the outlets. The mixing valves, the first mixing chamber 12 and possibly the control unit of the air conditioning system, are advantageously designed such that intensity and temperature of the air flows 7, 8 and 9 exiting the outlets 42, 44 and 46 hardly change upon adjustment of but one single mixing valve.

By contrast, the second mixing chamber 14, which is formed in the rear zone module 10, is based on a new fluid mechanical mixer concept, said concept being termed herein a "crossflow mixer". As can be seen from FIG. 1, the second warm partial air flow 20 of the mixing chamber 14 is supplied from the top. The also supplied second cool partial air flow 22, however, is supplied to the mixing chamber 14 from the side. As a result, the flow paths 70, 72 of the warm and the cool partial air flows 20, 22 intersect in the second mixing chamber 14 at an angle of about 135°. More specifically, the two partial air flows are partially caused to run counterflow in the mixing zone 66 being formed. With regard to the "crossflow mixer" concept of the invention, this counterflow pattern may have a positive effect in certain cases. However the crossflow mixer is not limited to such a flow pattern. It may instead be advantageously realized over a wide range of angles of intersection that may readily extend from 35° to 155°. By optimizing, in terms of fluid flow, the mixing chamber 14, and in particular the chimney 68 provided there that will be discussed in further detail herein after, this angular range may still be widened if necessary.

A leg space outlet 40 of mixing chamber 14 provided to supply the leg space in the rear zone with a warmer air-conditionable air flow 25 is disposed opposite the entrance site where the warm partial air flow 20 enters the second mixing chamber 14. The leg space outlet 40 for the rear zone is thereby disposed substantially underneath the second mixing chamber 14. A panel outlet 38 for the rear zone is disposed laterally from the second mixing chamber opposite the entrance site of the second cool partial air flow 22, though. A second air-conditionable air flow 24, which is slightly cooler than the one exiting the leg space outlet 40, exits said panel outlet 38. The precise ratio between the temperatures of the air-conditionable air flows 24 and 25 can be adjusted by the mix ratios in the "crossflow mixer". These mix ratios are substantially determined by the properties of the second mixing chamber 14 in terms of fluid mechanics. This is the reason why the air flows 24 and 25 are not adapted to be air-conditioned independently from one another with regard to temperature. The relative intensity of the air flows 24 and 25 exiting the ports 38 and 40 can be varied by means of another angled mixing valve 64, though.

Figure 2:
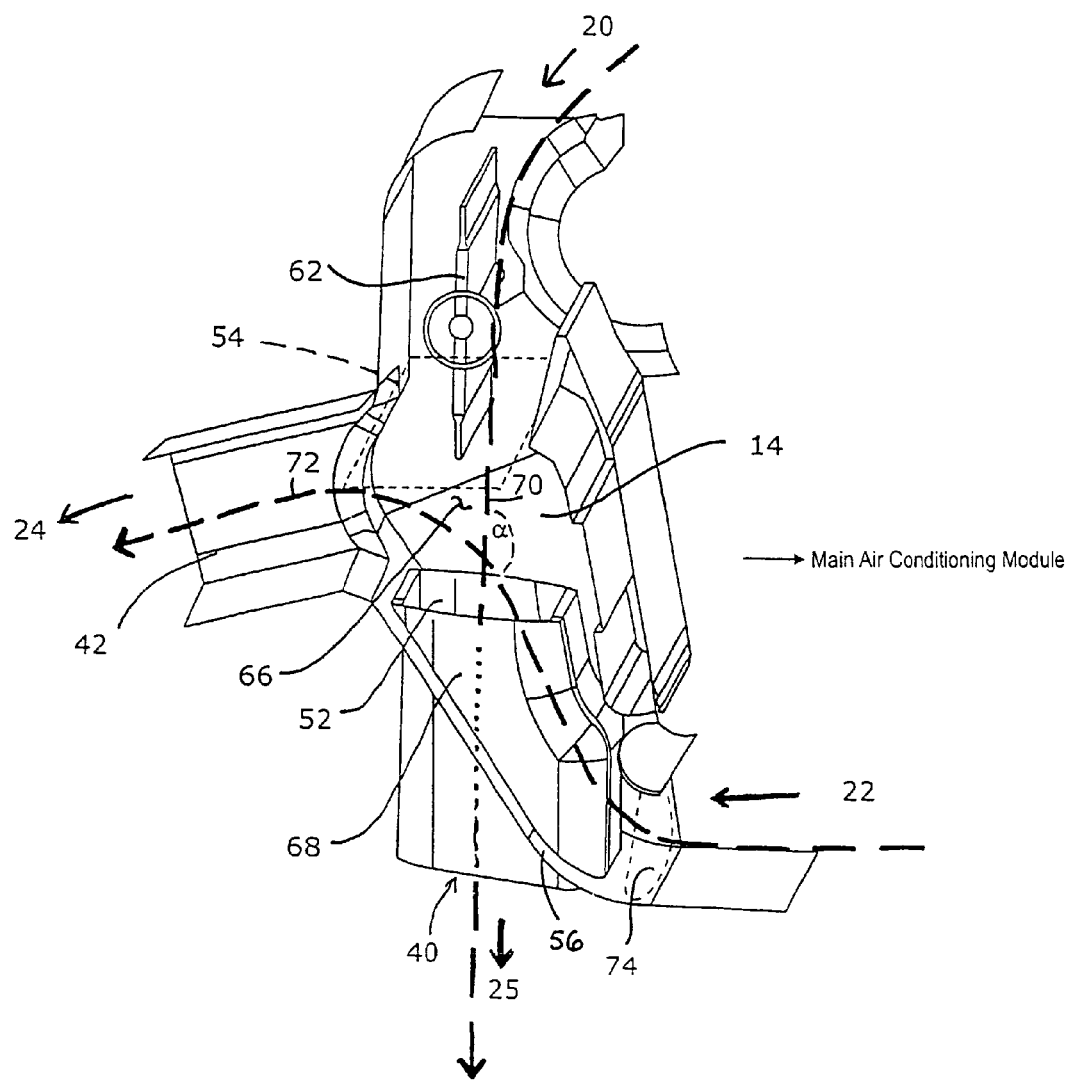
FIG. 2 is a perspective sectional view of the mixing chamber of the rear zone module of the air conditioning system of FIG. 1

FIG. 2 illustrates the fluid mechanical conditions within the second mixing chamber 14 of the air conditioning system, which is configured to be a "crossflow mixer". A second warm partial air flow 20 is supplied to the second mixing chamber 14 via a second flow path 31. This one enters the second mixing chamber from the top. The intensity of this second warm partial air flow 20 is regulated by means of a closing valve 62. Further, a second cool partial air flow 22 enters the second mixing chamber 14 through a laterally disposed entrance port that is disposed well beneath the entrance port for the second warm partial air flow 20. After the second warm partial air flow 20 has entered the second mixing chamber 14, it traverses a mixing zone 66 and is conducted toward a leg space outlet 40 for the rear zone. The second cool partial air flow 22, which has entered the second mixing chamber 14 in a horizontal flow direction, strikes an impingement baffle 56 and is redirected upward toward mixing zone 66 through said impingement baffle. Before reaching the mixing zone 66, it is thereby circulated around the leg space outlet 40 for the rear zone, which projects into the second mixing chamber 14 in the form of a chimney 68. Said chimney 68 ends only upon reaching the mixing zone 66 located in the center of the second mixing chamber 14.

In accordance with the invention, a portion of the second warm partial air flow 20 supplied to the mixing chamber 14 is conducted out of the second mixing chamber 14 through chimney 68 after having traversed the mixing zone 66. The aperture cross section of the upper aperture of chimney 68, which is proximate to the mixing zone 66, is thereby smaller than the cross-sectional area of the entrance port 54 of the second warm partial air flow 20 into the second mixing chamber 14. In accordance with the invention, a fraction of the second warm partial air flow 20, which is substantially determined by the area ratios, enters the chimney 68. This fraction of the second warm partial air flow 20 is therefore caused to exit the second mixing chamber 14 immediately upon entrance into mixing zone 66 without having been mixed with the second cool partial air flow 22. Here no relevant blending with the second cool air flow 22 occurred so that the air-conditionable air flow 25 exiting the leg space outlet 40 for the rear zone was only cooled down to a certain extent as compared to the incoming second warm partial air flow 20.

That fraction of the second warm partial air flow 20 that has not been captured by the entrance port 52 of the chimney 68 is mixed with the second cool partial air flow 22 passing by the chimney 68 in the mixing zone 66. This results in a considerable cooling effect. For this reason, a substantially cooler second air-conditionable air flow 24 exits the laterally disposed rear panel outlet 42. It is evident that the flow path 70 of the warm partial air flow 20 extends almost in a straight line through the second mixing chamber 14. It can also be seen that the flow path 72 of the cool partial air flow 22 does not extend in a straight line through the second mixing chamber 14. After having entered the second mixing chamber 14, the horizontally incoming second cool partial air flow 22 strikes a sloped surface that is configured to be an impingement baffle 56. Said impingement baffle 56 redirects the cool partial air flow 22 in the vertical direction so that, in the region of the mixing zone 66, it flows in a direction counter to the direction of the warm partial air flow 20. In the mixing zone 66, the flow paths 70 and 72 of the warm and of the cool partial air flow are inclined to one another at an angle α which, in the exemplary embodiment shown, is on the order of 135°. As already mentioned, such a counterflow pattern may have an advantageous effect, but it is not absolutely necessary for the "crossflow mixer" concept of the invention. More specifically, a flow pattern with an intersection angle of 90° and less, i.e., completely dispensing with counterflow, may also be advantageous. Those skilled in the art will recognize various possibilities to adapt the supply of the partial air flows to be mixed in the "crossflow mixer" to the construction conditions of the air conditioning system which is being designed.

In the exemplary embodiment shown, the size of the mixing zone 66 in which the warm and cool partial air flows 20, 22 partially blend is substantially determined by the distance the chimney 68 projects into the center of the second mixing chamber 14. Accordingly, the temperature difference between the generated air flows 24 and 25 may be determined in particular by dimensioning the chimney 68 accordingly.

Figure 3:
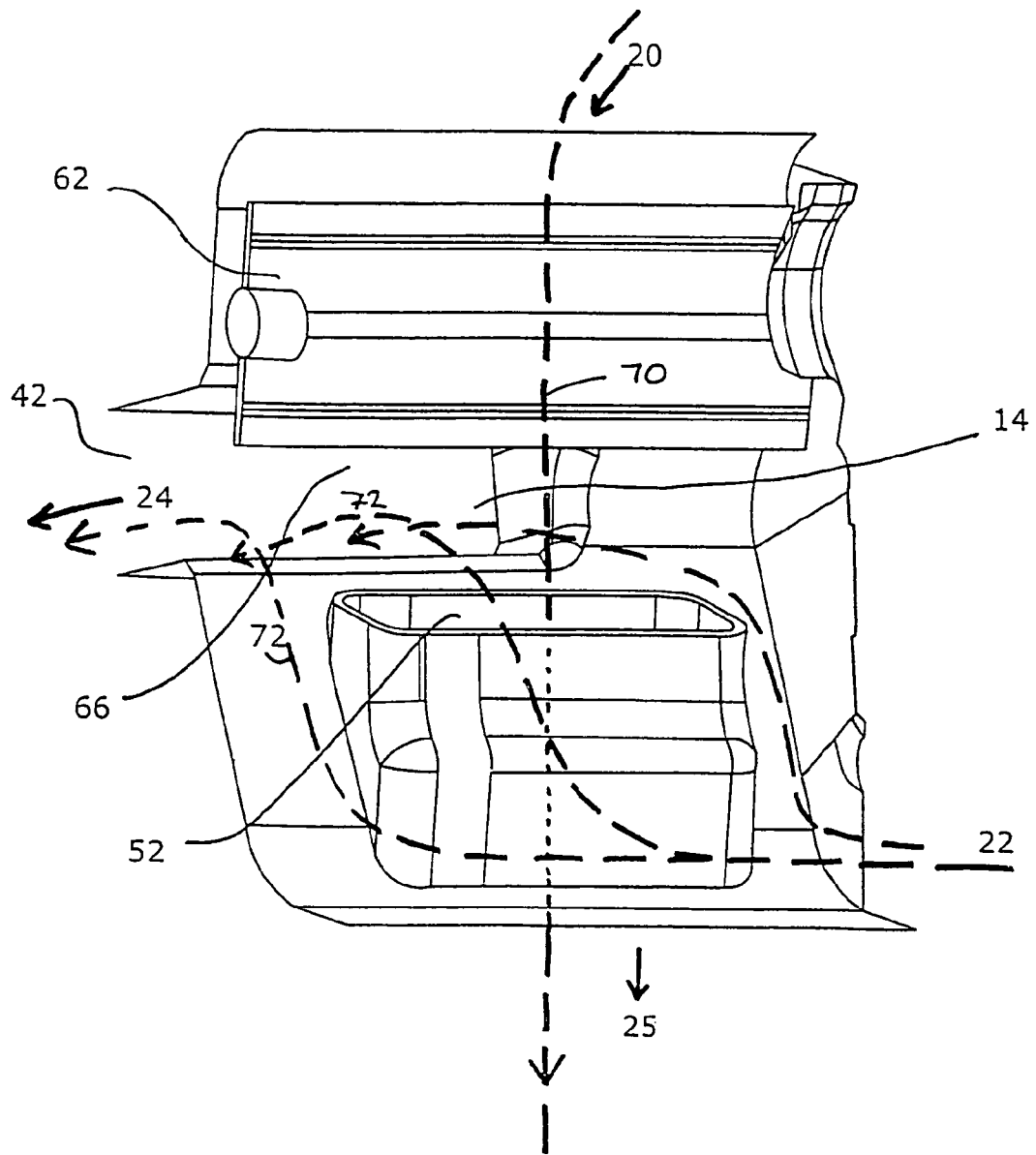
FIG. 3 is another perspective sectional view of the mixing chamber of FIG. 2.

FIG. 3 finally shows a partial perspective sectional view of the second mixing chamber 14 when viewed from the main module 2 toward the direction of the defrost outlet 42 for the rear zone. It can be readily seen that the chimney 68 is disposed in the center of the second mixing chamber 14 and that the second cool partial air flow 22 is passing by three sides thereof. The flow paths 72 laterally passing by the chimney 68 on the right and on the left side thereof lead a substantial portion of the incoming cool partial air flow 22 to the defrost outlet 42 for the rear zone. They thereby only slightly blend with those fractions of the warm partial air flow 22 that are not being received by the aperture cross section 52 of the chimney 68. By contrast, the fraction of the cool partial air flow 22 flowing along the flow path 72 running in the center is brought into intimate contact with the fraction of the warm partial air flow 22 that has been captured by the aperture cross section 52 of the chimney 68. It is thereby intimately blended with the latter and conducted to the leg space outlet 40 for the rear zone. From FIG. 3 it can be seen that the chimney 68 acts as a flow divider both for the second cool partial air flow 22 and for the second warm partial air flow 20.

To conclude, it should be noted that, to practically realize a mixing chamber relying for operation on the "crossflow mixer" concept, it is readily possible to vary, more specifically also to interchange, the supply of warm and cool partial air flows to the mixing chamber with regard to the exemplary embodiment discussed since gravitational influences or a lift are practically negligible with the mixing chamber dimensions of the "crossflow mixer" in question.

Finally, it will be realized that various outlets for air-conditionable air flows can be formed on the rear zone module 10. By providing a centrally disposed parting plane, the single-zone rear zone module 10 shown may be developed in a simple manner to achieve a two-zone rear zone module 10 which forms two separately controllable second mixing chambers 14, and similarly rear panel outlets 38 and rear leg space outlets 40 for the rear zone. A second cooler air flow 24 adapted to be air-conditioned (independently of the first air-conditionable air flow 8) exits the outlet 38. Another warmer air-conditionable air flow 25 the temperature of which is correlated with the temperature of the second air-conditionable air flow 24 exits the outlet 40.

It should be further noted that all of the outlet associations described herein above for the air conditioning system 1 of the invention are given by way of example only. As a matter of course, it is also possible to freely supply to the various vent ports of the automotive vehicle the various differently air-conditioned air flows provided by the air conditioning system 1. More specifically, the temperature differences between the leg space outlets on the one side and the panel and defrost outlets on the other side have been indicated by way of example only and can be selectively adapted to the requirements of the automotive vehicle manufacturer.

The fluid mechanical active actuator elements such as the closing and mixing valves that have been illustrated herein may for example be mounted on shafts and actuated by means of current servomotors, more specifically by a stepper motor. The drive of these active actuator elements is preferably achieved by a central air-conditioning control unit that receives the commands of the user of the automotive vehicle and adjusts the actuator elements so as to carry into effect the user's inputs.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

The invention claimed is:

1. An air conditioning system for providing air conditioning to the interior of an automotive vehicle comprising: a housing defining a mixing chamber designed to create, by controlled mixing of a warm and of a cool partial air flow, at least one warmer and one cooler air-conditionable air flow, a first inlet into the mixing chamber and a first outlet out of the mixing chamber, the first inlet being located opposite the first outlet and the first inlet and first outlet cooperating to define a first flow path in a first flow direction through the mixing chamber, a second inlet into the mixing chamber and a second outlet out of the mixing chamber, the second inlet being located generally opposite the second outlet and the second inlet and second outlet cooperating to define a second flow path in a second flow direction through the mixing chamber, the warm partial air flow entering the mixing chamber through the first inlet and the cool partial airflow entering the mixing chamber through the second inlet, the first and second flow directions defining a counter flow pattern in the mixing chamber, an elongated port spaced apart from and extending within the housing and into the mixing chamber to restrict extension of the mixing zone, the elongated port having contiguous exterior side walls there around and cooperating to define an entrance into the elongated port, the elongated port extending from the first outlet to a location within the second flow path between the second inlet and second outlet such that a portion of the cool partial airflow is directed laterally around the exterior side walls of the elongated port within the mixing chamber;

the warmer air-conditionable airflow exiting the mixing chamber through the first outlet and the cooler air-conditionable airflow exiting the mixing chamber through the second outlet.

2. The air conditioning system for providing air conditioning to the interior of an automotive vehicle according to claim 1, wherein portions define a mixing zone at the intersection of the warm and of the cool partial air flows, said mixing zone being dimensioned such that the warm and the cool partial air flows do not completely blend in the mixing zone.

3. The air conditioning system for providing air conditioning to the interior of an automotive vehicle according to claim 1, wherein the elongated port, is disposed in the first flow path of the warm partial air flow in the mixing chamber.

4. The air conditioning system for providing air conditioning to the interior of an automotive vehicle according to claim 3, wherein the entrance of the elongated port has an entrance cross section area that is smaller than a cross section area of the first inlet.

5. The air conditioning system for providing air conditioning to the interior of an automotive vehicle according to claim 1, wherein the elongated port is disposed in the flow path of the warm partial air flow and the cool partial air flow in the mixing chamber.

6. The air conditioning system for providing air conditioning to the interior of an automotive vehicle according to claim 5, wherein the entrance of the elongated port defines an entrance cross section area that is smaller than a cross section area of one of the first and second inlets.

7. The air conditioning system for providing air conditioning to the interior of an automotive vehicle according to claim 1, further comprising an impingement baffle in the mixing chamber and located prior to entering a mixing zone such that one of the warm and cold partial air flows entering the mixing chamber is deflected by the impingement baffle in such a manner that the directions of flow of the warm and cold partial air flows in the mixing zone are inclined relative to each other at an angle of between 25° and 155°.

* * * * *